United States Patent
Sun et al.

(10) Patent No.: US 10,706,090 B2
(45) Date of Patent: Jul. 7, 2020

(54) METHOD AND DEVICE FOR LOCATING AN ANSWER BASED ON QUESTION AND ANSWER

(71) Applicant: BEIJING BAIDU NETCOM SCIENCE AND TECHNOLOGY CO., LTD., Beijing (CN)

(72) Inventors: Xingwu Sun, Beijing (CN); Xingjian Li, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 232 days.

(21) Appl. No.: 15/858,570

(22) Filed: Dec. 29, 2017

(65) Prior Publication Data
US 2018/0189385 A1    Jul. 5, 2018

(30) Foreign Application Priority Data

Dec. 29, 2016  (CN) .......................... 2016 1 1249487

(51) Int. Cl.
| | |
|---|---|
| *G06F 7/00* | (2006.01) |
| *G06F 16/00* | (2019.01) |
| *G06F 16/33* | (2019.01) |
| *G06F 16/242* | (2019.01) |
| *G06F 16/2457* | (2019.01) |
| *G06F 40/30* | (2020.01) |
| *G06F 40/205* | (2020.01) |
| *G06F 40/289* | (2020.01) |

(52) U.S. Cl.
CPC ........ *G06F 16/3346* (2019.01); *G06F 16/243* (2019.01); *G06F 16/24578* (2019.01); *G06F 40/205* (2020.01); *G06F 40/289* (2020.01); *G06F 40/30* (2020.01)

(58) Field of Classification Search
None
See application file for complete search history.

(56) References Cited

U.S. PATENT DOCUMENTS

| | | | |
|---|---|---|---|
| 6,665,640 | B1 * | 12/2003 | Bennett .................... G09B 5/04 704/257 |
| 2009/0287678 | A1 * | 11/2009 | Brown .................... G06F 17/28 |
| 2012/0078890 | A1 | 3/2012 | Fan et al. |

(Continued)

FOREIGN PATENT DOCUMENTS

| | | |
|---|---|---|
| CN | 103221952 A | 7/2013 |
| CN | 104375988 A | 2/2015 |

OTHER PUBLICATIONS

Office Action issued in corresponding Chinese Application No. 201611249487.2, dated Aug. 30, 2019 (9 pages).

*Primary Examiner* — Tuan A Pham
(74) *Attorney, Agent, or Firm* — Osha Liang LLP (57) ABSTRACT

The present disclosure discloses a method and a device for locating an answer based on question and answer, in which the method includes: receiving a query sentence; parsing the query sentence, to generate a semantic parse tree corresponding to the query sentence; matching the semantic parse tree with a pre-established matching base, to obtain an alignment probability between each of candidate answers in the pre-established matching base and the semantic parse tree; and determining a final answer according to the alignment probability.

11 Claims, 9 Drawing Sheets

(56) References Cited

U.S. PATENT DOCUMENTS

2014/0040288 A1* 2/2014 Galitsky ............... G06F 17/271
                                                        707/755
2015/0331935 A1* 11/2015 Jamrog ................ G06F 17/271
                                                        707/722
2017/0330106 A1* 11/2017 Lindsley ................... G06N 5/02
2017/0364806 A1* 12/2017 Boyer .................... G06N 5/022

* cited by examiner

News Video Webpage Map Tieba Application More ▾

| Why is the sea salty | Search | / 31 |

"About 3 billion tons of salt is brought into the ocean every year, thus the ocean becomes a home for dissolving salts. In the process of evaporation of seawater, the salts can not be evaporated with the steam, and can only stay in the ocean. Cyclically, with accumulation of salty materials in the ocean, the sea gets salter and salter."

Answers from: Baidu Zhidao

METHOD AND DEVICE FOR LOCATING AN ANSWER BASED ON QUESTION AND ANSWER

CROSS-REFERENCE TO RELATED APPLICATION

The present application is based upon and claims priority to Chinese Patent Application No. 201611249487.2, filed on Dec. 29, 2016, the entirety contents of which are incorporated herein by reference.

FIELD

The present disclosure relates to an internet technology field, and more particularly to a method and a device for locating an answer based on question and answer.

BACKGROUND

Deep question and answer (DeepQA for short) means a technology which can understand languages of human, intelligently identify meanings of a question, and extract an answer to the question from a huge number of internet data.

With the rapid development of the internet, functions of the search engine are becoming increasingly powerful, and an expectation of user to the search engine is also getting higher and higher, starting to change from basic related webpage recall to the intelligent question and answer. When a user input a question to be queried via the search engine, the user expects to directly obtain an answer to the question rather than related webpages.

However, search engine technology in the related art can only provide webpages with high relevance as the search results to the user by using information retrieval technology and document summarization technology, and the user needs to determine webpages to be viewed in combination with webpage titles, text summary, or further webpage links and has to find an answer from redundant text contents by himself. Therefore, answers that the user needs cannot be provided to the user intuitively and clearly in the related art.

SUMMARY

Embodiments of the present disclosure seek to solve at least one of the problems existing in the related art to at least some extent.

For this, a first objective of the present disclosure is to provide a method for locating an answer based on question and answer. With this method, it is unnecessary for the user to click links and find an answer from redundant text contents, and answers that the user needs can be provided intuitively and clearly, thus deeply satisfying the search service demand of the user.

A second objective of the present disclosure is to provide a device for locating an answer based on question and answer.

A third objective of the present disclosure is to provide a terminal.

A forth objective of the present disclosure is to provide a non-transitory computer-readable storage medium.

A fifth objective of the present disclosure is to provide a program product.

In order to achieve the above objectives, embodiments of a first aspect of the present disclosure provide a method for locating an answer based on question and answer, including: receiving a query sentence; parsing the query sentence, to generate a semantic parse tree corresponding to the query sentence; matching the semantic parse tree with a pre-established matching base, to obtain an alignment probability between each of candidate answers in the pre-established matching base and the semantic parse tree; and determining a final answer according to the alignment probability.

In order to achieve the above objectives, embodiments of a second aspect of the present disclosure provide a device for locating an answer based on question and answer, including: a receiving module, configured to receive a query sentence; a parsing module, configured to parse the query sentence, to generate a semantic parse tree corresponding to the query sentence; a matching module, configured to match the semantic parse tree with a pre-established matching base, to obtain an alignment probability between each of candidate answers in the pre-established matching base and the semantic parse tree; and a determining module, configured to determine a final answer according to the alignment probability.

In order to achieve the above objectives, embodiments of a third aspect of the present disclosure provide a terminal, including: one or more processors and a storage configured to store instructions executable by the one or more processors, wherein the one or more processors are configured to execute following steps: receiving a query sentence; parsing the query sentence, to generate a semantic parse tree corresponding to the query sentence; matching the semantic parse tree with a pre-established matching base, to obtain an alignment probability between each of candidate answers in the pre-established matching base and the semantic parse tree; and determining a final answer according to the alignment probability.

In order to achieve the above objectives, embodiments of a forth aspect of the present disclosure provide a non-transitory computer-readable storage medium, configured to store one or more programs, in which, when the one or more programs are executed by a processor of a mobile terminal, the mobile terminal is caused to execute a method for locating an answer based on question and answer, including: receiving a query sentence; parsing the query sentence, to generate a semantic parse tree corresponding to the query sentence; matching the semantic parse tree with a pre-established matching base, to obtain an alignment probability between each of candidate answers in the pre-established matching base and the semantic parse tree; and determining a final answer according to the alignment probability.

In order to achieve the above objectives, embodiments of a fifth objective of the present disclosure provide a program product, when instructions in the program product are executed by a processor, the processor is configured to execute a method for locating an answer based on question and answer, including: receiving a query sentence; parsing the query sentence, to generate a semantic parse tree corresponding to the query sentence; matching the semantic parse tree with a pre-established matching base, to obtain an alignment probability between each of candidate answers in the pre-established matching base and the semantic parse tree; and determining a final answer according to the alignment probability.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure. Instead, the embodiments of the present disclosure comprise all the variants, modifications and their equivalents within the spirit and scope of the present disclosure as defined by the claims.

With the development of the network information technology, the user's demand for a search engine cannot be satisfied with the basic related webpage recall, and begins to change to a direction of intelligent question and answer. For example, when a user input a query sentence "Why is the sea salty" through the search engine, the user wishes to directly obtain a reason why the sea is salty from a search result display interface.

However, the search engine in the related art can only provide search results which are related to a query sentence to the user by means of traditional information retrieval technology and document summarization technology. At the same time, words that can summarize webpage content are extracted from the webpage by summary calculation and are provided to the user to assist the user in determining a content to be clicked. The user has to determine a webpage to be viewed in combination with webpage titles, text summary, or further webpage links and find an answer from redundant text contents by himself. It can be seen that, the search engine technology in the related art can not satisfy a demand for directly obtaining required answers from the search result display interface of the user.

Therefore, in order to compensate for the disadvantages in the related art, the present disclosure provides a method for locating an answer based on question and answer, to intuitively and clearly provide answers that the user needs in the search result display interface.

Figure 1:
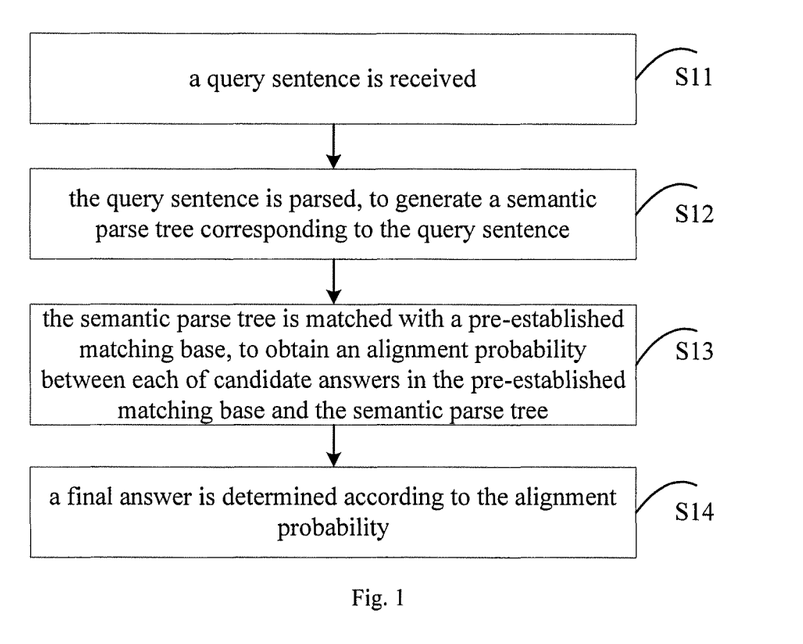
FIG. 1 is a flow chart of a method for locating an answer based on question and answer according to an embodiment of the present disclosure.

FIG. 1 is a flow chart of a method for locating an answer based on question and answer according to an embodiment of the present disclosure.

As shown in FIG. 1, the method for locating an answer based on question and answer according to an embodiment of the present disclosure includes the followings.

In block S11, a query sentence is received.

In an embodiment, when the user wants to acquire an answer to a question, for example, the user wants to know a reason why the sea is salty, the user can input a question (i.e., why is the sea salty) to be queried in the search engine. The search engine receives the query sentence input by the user, and searches for answers.

In block S12, the query sentence is parsed, to generate a semantic parse tree corresponding to the query sentence.

In an embodiment, after the search engine receives the query sentence input by the user, the search engine further parses the query sentence to generate the semantic parse tree corresponding to the query sentence.

In block S13, the semantic parse tree is matched with a pre-established matching base, to obtain an alignment probability between each of candidate answers in the pre-established matching base and the semantic parse tree.

The alignment probability between each of candidate answers in the pre-established matching base and the semantic parse tree includes a word alignment probability or a phrase alignment probability.

In an embodiment, after the query sentence is parsed and the semantic parse tree corresponding to the query sentence is obtained, the semantic parse tree is matched with the pre-established matching base, to obtain the alignment probability between each of candidate answers in the pre-established matching base and the semantic parse tree, i.e., to obtain a word alignment probability or a phrase alignment probability between each of the candidate answers in the pre-established matching base and the semantic parse tree.

Specifically, when obtained alignment probability is the word alignment probability, matching the semantic parse tree with a pre-established matching base to obtain an alignment probability between each of candidate answers in the pre-established matching base and the semantic parse tree includes: obtaining an alignment probability of each part of speech in the semantic parse tree; and obtaining the word alignment probability according to the alignment probability of each part of speech in the semantic parse tree.

More specifically, the alignment probability of each part of speech in the semantic parse tree can be obtained by the following formulas (1)-(4).

$$Score_{lat} = \max_{word_i \in answer} P(word_i \mid lat) * P(lat \mid word_i) * \text{weight}(word_i) \quad (1)$$

$$Score_{verb} = \max_{word_i \in answer} P(word_i \mid \text{verb}) * P(\text{verb} \mid word_i) * \text{weight}(word_i) \quad (2)$$

$$Score_{noun} = \max_{word_i \in answer} P(word_i \mid \text{noun}) * P(\text{noun} \mid word_i) * \text{weight}(word_i) \quad (3)$$

$$Score_{adj} = \max_{word_i \in answer} P(word_i \mid adj) * P(adj \mid word_i) * \text{weight}(word_i) \quad (4)$$

where, lat, verb, noun, and adj represent a core word of the question (query sentence), a verb, a noun, and an adjective of the question respectively, correspondingly, $Score_{lat}$, $Score_{verb}$, $Score_{noun}$, and $Score_{adj}$ represent an alignment probability of the core word of the question, an alignment probability of the verb, an alignment probability of the noun, and an alignment probability of the adjective respectively.

Taking calculating an alignment probability of the core word lat of the question as an example, all words in the candidate answer to be matched are traversed, and for each word (word$_i$,0<=i<=N, in which N represents a number of words in the candidate answer to be matched) in the candidate answer to be matched, a positive probability (represented by P(word$_i$|lat)) and a reverse probability (represented by P(lat|word$_i$)) of the core word of the question are obtained, and the positive probability P(word$_i$|lat), the reverse probability P(lat|word$_i$), and significance (represented by weight(word$_i$)) of the word are multiplied together. A maximum value of obtained products is the alignment probability of the core word of the question.

It should be noted that, in the query sentence input by the user, the core word, the verb, the noun, and the adjective of the question generally play a key role in matching process. Therefore, the alignment probabilities corresponding respectively to the core word, the verb, the noun, and the adjective of the question are obtained in the method for locating an answer based on question and answer according to the present disclosure.

After the alignment probability of each part of speech in the semantic parse tree is obtained, the word alignment probability can be obtained according to the alignment probability of each part of speech in the semantic parse tree by formula (5), which is shown as follows.

$$\text{Score} = (\alpha \text{Score}_{lat} * \beta \text{Score}_{verb} * \gamma \text{Score}_{noun} * \delta \text{Score}_{adj}) * \text{offset\_punish} \quad (5)$$

where, $\alpha$, $\beta$, $\gamma$, and $\delta$ represent weights of the alignment probabilities of the core word of the question, the verb, the noun, and the adjective respectively, which can be obtained by training, and offset_punish represents a penalty of an offset.

When the alignment probability between each of candidate answers in the pre-established matching base and the semantic parse tree is the phrase alignment probability, matching the semantic parse tree with a pre-established matching base to obtain an alignment probability between each of candidate answers in the pre-established matching base and the semantic parse tree includes: calculating a product of an alignment probability of each of successfully matching phrases and a number of words in the respective successfully matching phrase, to obtain a positive probability and a reverse probability of each of the successfully matching phrases, in which the successfully matching phrases are phrases that are successfully matched between candidate answers in the pre-established matching base and the semantic parsing tree; and obtaining a maximum value from the positive probability and the reverse probability of each of the successfully matching phrases, and performing a weighted summation on obtained maximum values to obtain the phrase alignment probability.

A formula for calculating the phrase alignment probability is shown as formula (6).

$$\text{Score}_{phrase} = \sum_{\substack{phrase_i \in query \\ phrase_j \in answer}} \max(\text{term\_cnt}(phrase_j) * P(phrase_j | phrase_i), \text{term\_cnt}(phrase_i) * P(phrase_i | phrase_j)) \quad (6)$$

where, phrase$_i$ and phrase$_j$ represent a phase in the question (query sentence) and a phase in the candidate answer to be matched respectively; Score$_{phrase}$ represents the phrase alignment probability, term_cnt (phrase$_i$) and term_cnt (phrase$_j$) represent a number of words in phrase$_i$, and a number of words in phrase$_j$ respectively; P(phrase$_i$|phrase$_j$) and P(phrase$_j$|phrase$_i$) represent an alignment probability of phrase$_i$ in the query relative to phrased in the candidate answer to be matched, and an alignment probability of phrase$_j$ in the candidate answer to be matched relative to phrase, in the query, respectively.

Figure 2:
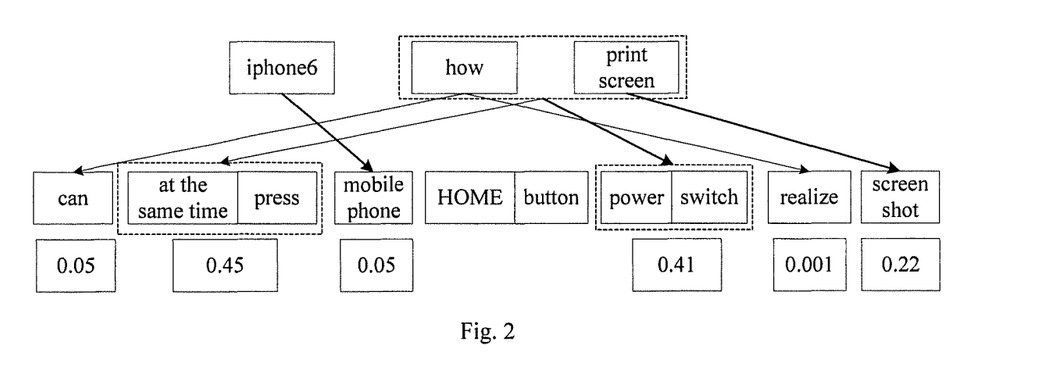
FIG. 2 is a schematic diagram of obtaining an alignment probability between each of the candidate answers and the semantic parse tree according to an embodiment of the present disclosure.

FIG. 2 is a schematic diagram of obtaining an alignment probability between each of the candidate answers and the semantic parse tree according to an embodiment of the present disclosure.

As shown in FIG. 2, a query sentence input by the user is "How to print screen in iPhone6". After the query sentence is parsed, a corresponding semantic parse tree containing "iPhone6", "how", and "print screen" is obtained. By matching the semantic parse tree with the pre-established matching base, a candidate answer "HOME button and power switch of the mobile phone can be pressed at the same time to realize screenshot" in the pre-established matching base is obtained, and an alignment probability between the candidate answer and the semantic parse tree is calculated by using above-mentioned formulas. It can be seen from FIG. 2 that, "iPhone6" matches "mobile phone", with an alignment probability of 0.05, "how" matches "can" and "realize", with an alignment probability of 0.05 and an alignment probability of 0.001 respectively, "print screen" matches "screenshot", with an alignment probability of 0.22. In FIG. 2, parts in dashed boxes represent phrases. It can be seen that, phrase "how to print screen" matches "press at the same time" and "power switch", with an alignment probability of 0.45 and an alignment probability of 0.41 respectively.

In block S14, a final answer is determined according to the alignment probability.

In an embodiment, after the alignment probability between each of candidate answers in the pre-established matching base and the semantic parse tree is obtained, the final answer can be determined according to the alignment probability.

Specifically, the candidate answers can be ranked according to the word alignment probability and/or the phrase alignment probability, and a candidate answer having a highest ranking score is determined as the final answer.

In an embodiment, after the final answer is determined, corresponding processing, such as bolding, changing color of words, or the like, can be performed on the final answer, and processed answer is displayed in the search result display page.

Figure 3:
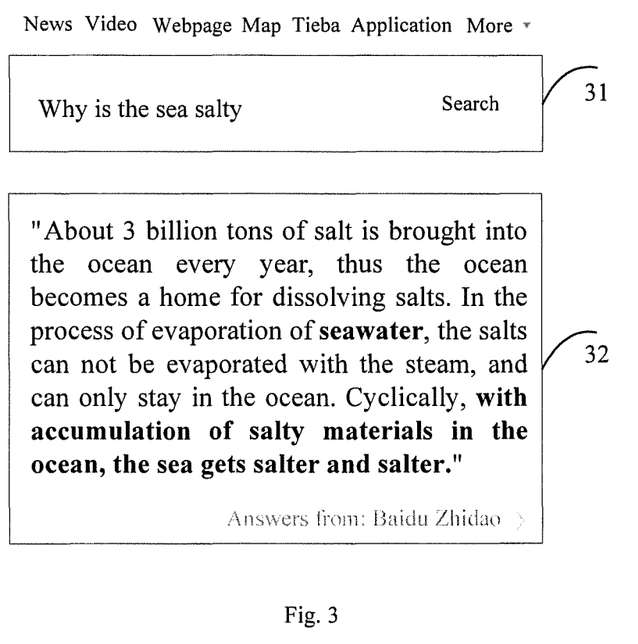
FIG. 3 is a schematic diagram of a search result display interface of a search engine applying the method for locating an answer based on question and answer according to an embodiment of the present disclosure.

FIG. 3 is a schematic diagram of a search result display interface of a search engine applying the method for locating an answer based on question and answer according to an embodiment of the present disclosure.

As shown in FIG. 3, when the user input a query sentence "Why is the sea salty" in a search box 31, after bolding an answer corresponding to the query sentence in the obtained search result, the search engine displays processed search result in a display window 32. When the user views the search result in the display window 32, the user can directly obtain from the bolded words that, the reason why the sea is salty is that "with accumulation of salty materials in the ocean, the sea gets salter and salter". It can be seen that, the method for locating an answer based on question and answer according to embodiments of the present disclosure can help the user to obtain required information intuitively and quickly.

With the method for locating an answer based on question and answer according to embodiments of the present disclosure, by receiving the query sentence, parsing the query sentence to generate the semantic parse tree corresponding to the query sentence, matching the semantic parse tree with the pre-established matching base, to obtain the alignment probability between each of candidate answers in the pre-established matching base and the semantic parse tree, and determining the final answer according to the alignment probability, it is unnecessary for the user to click links and find an answer from redundant text contents, and answers that the user needs can be provided intuitively and clearly, thus deeply satisfying the search service demand of the user.

Figure 4:
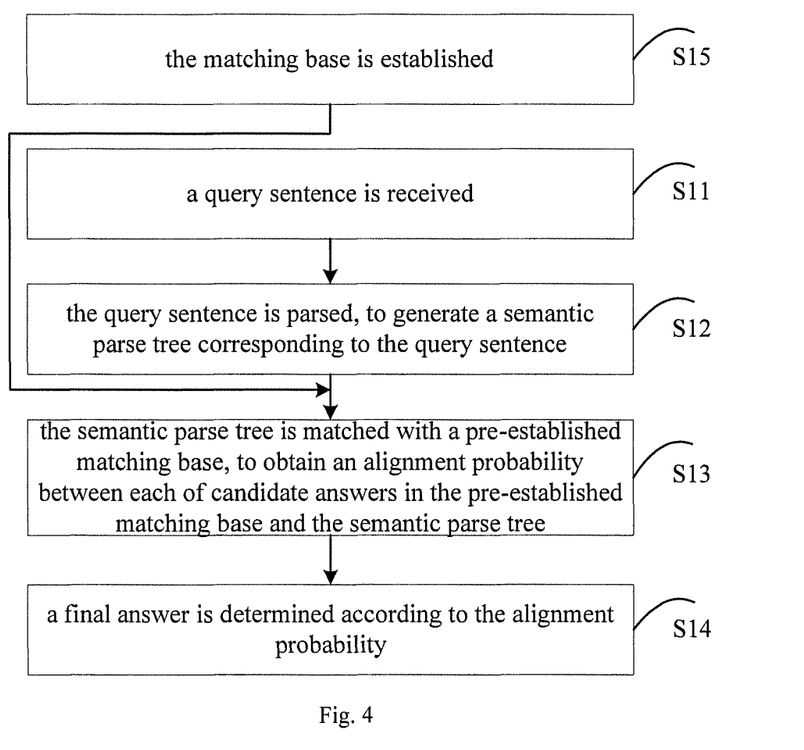
FIG. 4 is a flow chart of a method for locating an answer based on question and answer according to another embodiment of the present disclosure.

FIG. 4 is a flow chart of a method for locating an answer based on question and answer according to another embodiment of the present disclosure.

As shown in FIG. 4, based on above embodiments, the method for locating an answer based on question and answer can further include the followings.

In block S15, the matching base is established.

In an embodiment, in order to match the semantic parse tree, it is required to establish the matching base prior to matching the semantic parse tree and the matching base.

Figure 5:
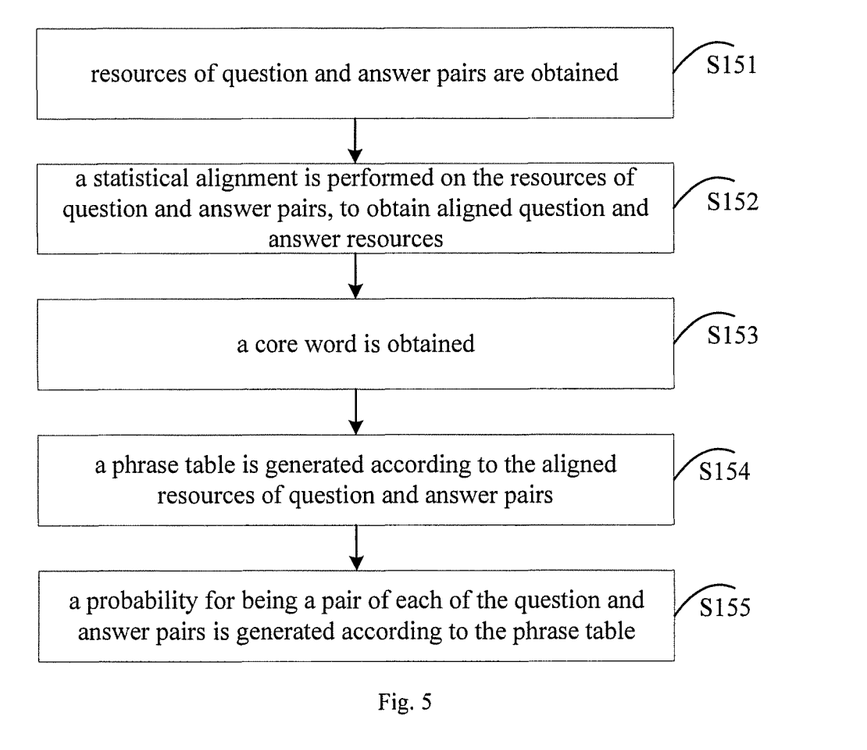
FIG. 5 is a flow chart of establishing the matching base according to an embodiment of the present disclosure.

Specifically, as shown in FIG. 5, the matching base can be established by the followings.

In block S151, resources of question and answer pairs are obtained.

The resources of question and answer pairs include query sentence samples and corresponding answer samples.

The resources of question and answer pairs can be obtained from question and answer communities or question and answer websites. For example, plentiful resources of question and answer pairs can be obtained from Baidu Zhidao, 360 question and answer, and other communities.

For example, a query sentence sample is "Why is the sea salty". An answer sample obtained from Baidu Zhidao is "The ocean is salty because there is high concentration of salt in the sea. The salt mainly has the following two sources: the first one is that minerals containing salt are brought into rivers and finally into the ocean by an erosion effect on soil and rock on land during a process that rainfalls form runoff; and the second one is that some salt dissolves into the sea by geological activities (such as volcanoes, seafloor hydrothermal area, and the like) of seafloor itself". Therefore, the query sentence sample and the answer sample form a question and answer pair. A set of plentiful question and answer pairs forms the resources of question and answer pairs.

It should be noted that, in order to generate the matching base by training, it is required to obtain plentiful question and answer pairs, thus forming the resources of question and answer pairs, so as to ensure comprehensiveness of the matching base.

In block S152, a statistical alignment is performed on the resources of question and answer pairs, to obtain aligned question and answer resources.

In an embodiment, after the resources of question and answer pairs are obtained, the statistical alignment is performed on each of the question and answer pairs.

Specifically, a global optimal solution for word matching is solved in each of the question and answer pairs by a machine learning method in the related art, to obtain an alignment relationship between words in a query sentence sample and words in an answer sample in a question and answer pair.

Figure 6:
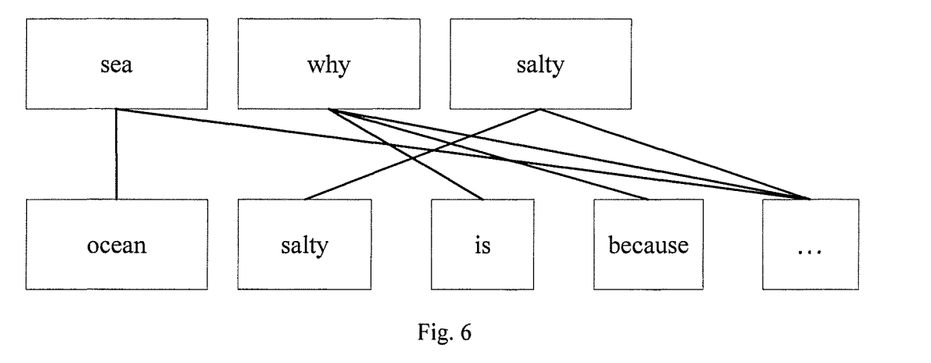
FIG. 6 is a schematic diagram of a statistical alignment result of a question and answer pair.

FIG. 6 is a schematic diagram of a statistical alignment result of a question and answer pair.

Still taking the question and answer pair "Why is the sea salty" as an example, it can be seen from FIG. 6 that, a result of the statistical alignment of the question and answer pair is that "sea" in the query sentence sample matches "ocean" in the answer sample, "why" matches "because" and "is", "salty" matches "salty", and so on. In FIG. 6, " . . . " represents other parts of the answer sample, which are not listed one by one herein in order to avoid redundancy.

In block S153, a core word is obtained.

In an embodiment, in order to improve accuracy of the statistical alignment, a core word of each of the query sentence samples in the resources of question and answer pairs. The core word is used to filter words matching the core word, so as to obtain more accurate statistical alignment relationships.

Alternatively, the core word can be obtained by related art (such as machine learning sequence labeling method). A hit degree between a query sentence and an answer sentence can be obtained by covered query ratio (CQR for short). Matching words having a low CQR value and sentences that are not hit by the core word are filtered out.

For example, taking example shown in FIG. 6 as an example, an obtained core word is "why", words matching the core word "why" can be calculated using CQR method, which are "is" and "because". It can be determined that a CQR value of "because" is higher than a CQR value of "is", therefore, "is" is filtered out, and a matching word of "why" is "because".

In block S154, a phrase table is generated according to the aligned resources of question and answer pairs.

In an embodiment, after the core word of the each of the query sentence samples is obtained, and after the words matching the core word are filtered to obtain more accurate statistical alignment relationships, the phrase table is generated according to twice aligned resources of question and answer pairs.

Specifically, in the aligned resources of question and answer pairs, words that are able to form a phrase in the query sentence samples form a first set of phrases, and words that are able to form a phrase in the answer samples form a second set of phrases. The phrase table is generated according to the first set of phrases and the second set of phrases.

In block S155, a probability for being a pair of each of the question and answer pairs is generated according to the phrase table.

In an embodiment, after the phrase table is obtained, the probability for being a pair of each of the question and answer pairs is generated according to the phrase table.

Specifically, after the phrase table is obtained, the resources of question and answer pairs are analyzed and generalized according to the phrase table by using dependency analysis technology, and the probability for being a pair of each of the question and answer pairs is calculated according to an arranged formula.

The resources of question and answer pairs are generalized mainly based on dependency relationships, part of speech, the phrase table, limited conditions of regulation, and the like.

For example, the query sentence sample "Why is the sea salty" is generalized as "why is A B", the corresponding answer sample "The ocean is salty because there is high concentration of salt in the sea" is generalized as "A is B because".

After the resources of question and answer pairs are analyzed and generalized, the probability for being a pair of each of the question and answer pairs can be calculated with formula (7), shown as follows:

$$P(QF \mid AF) = \frac{\text{Count}(af, qf)}{\sum_{af\_i} \text{count}(af, qf\_i)} \quad (7)$$

where, af represents generalized segments in an answer, qf represents generalized segments in a query sentence, Count(af,qf) represents a co-occurrence frequency of af and qf, and count(af,qf_i) represents a co-occurrence frequency of $i^{th}$ generalized segment in the query sentence and the generalized segments in an answer.

After the probability for being a pair of each of the question and answer pairs is obtained, establishment of the matching base is completed.

It should be noted that, the process for establishing the matching base in block S15 can be executed at any time before block S13 is executed, and execution time of block S15 is not limited in the present disclosure.

With the method for locating an answer based on question and answer according to embodiments of the present disclosure, by obtaining the resources of question and answer pairs, performing the statistical alignment on the resources of question and answer pairs, obtaining the core word, generating the phrase table according to the aligned resources of question and answer pairs, and generating the probability for being a pair of each of the question and answer pairs to establish the matching base, a more accurate matching base can be obtained, thus ensuring accuracy of the final answer.

Figure 7:
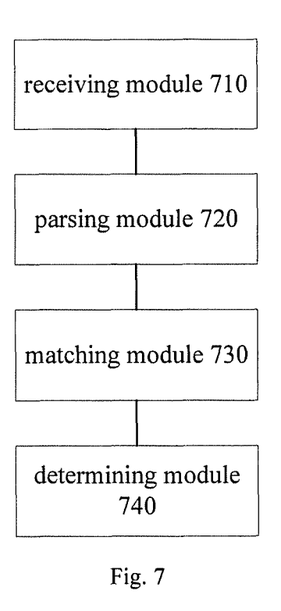
FIG. 7 is a schematic diagram of a device for locating an answer based on question and answer according to an embodiment of the present disclosure.

In order to realize the above embodiments, the present disclosure also provides a device for locating an answer based on question and answer. FIG. 7 is a schematic diagram of a device for locating an answer based on question and answer according to an embodiment of the present disclosure.

As shown in FIG. 7, the device for locating an answer based on question and answer according to an embodiment of the present disclosure includes a receiving module 710, a parsing module 720, a matching module 730, and a determining module 740.

The receiving module 710 is configured to receive a query sentence.

The parsing module 720 is configured to parse the query sentence, to generate a semantic parse tree corresponding to the query sentence.

The matching module 730 is configured to match the semantic parse tree with a pre-established matching base, to obtain an alignment probability between each of candidate answers in the pre-established matching base and the semantic parse tree.

The alignment probability between each of candidate answers in the pre-established matching base and the semantic parse tree includes a word alignment probability or a phrase alignment probability.

Specifically, when the alignment probability between each of candidate answers in the pre-established matching base and the semantic parse tree is the word alignment probability, the matching module 730 is configured to obtain an alignment probability of each part of speech in the semantic parse tree, and to obtain the word alignment probability according to the alignment probability of each part of speech in the semantic parse tree.

When the alignment probability between each of candidate answers in the pre-established matching base and the semantic parse tree is the phrase alignment probability, the matching module 730 is configured to calculate a product of an alignment probability of each of successfully matching phrases and a number of words in the respective successfully matching phrase, to obtain a positive probability and a reverse probability of each of the successfully matching phrases, and to obtain a maximum value from the positive probability and the reverse probability of each of the successfully matching phrases, and to perform a weighted summation on obtained maximum values to obtain the phrase alignment probability. The successfully matching phrases are phrases that are successfully matched between candidate answers in the pre-established matching base and the semantic parsing tree.

The determining module 740 is configured to determine a final answer according to the alignment probability.

Specifically, the determining module 740 is configured to rank the candidate answers according to the word alignment probability and/or the phrase alignment probability, and to determine a candidate answer having a highest ranking score as the final answer.

It should be noted that, the explanation in above embodiments of the method for locating an answer based on question and answer is also applicable to the embodiments of the device for locating an answer based on question and answer in this embodiment, with similar implementation principle, which is not described here.

With the device for locating an answer based on question and answer according to embodiments of the present disclosure, by receiving the query sentence, parsing the query sentence to generate the semantic parse tree corresponding to the query sentence, matching the semantic parse tree with the pre-established matching base, to obtain the alignment probability between each of candidate answers in the pre-established matching base and the semantic parse tree, and determining the final answer according to the alignment probability, it is unnecessary for the user to click links and find an answer from redundant text contents, and answers that the user needs can be provided intuitively and clearly, thus deeply satisfying the search service demand of the user.

Figure 8:
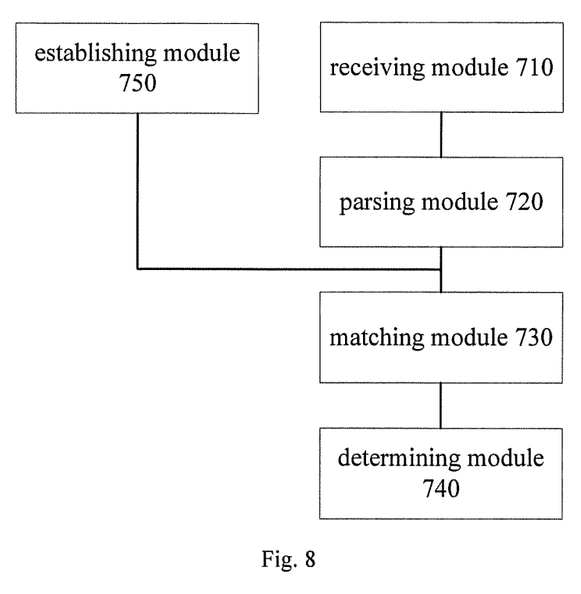
FIG. 8 is a schematic diagram of a device for locating an answer based on question and answer according to another embodiment of the present disclosure.

FIG. 8 is a schematic diagram of a device for locating an answer based on question and answer according to another embodiment of the present disclosure.

As shown in FIG. 8, based on embodiments shown in FIG. 7, the device for locating an answer based on question and answer further includes an establishing module 750.

The establishing module 750 is configured to establish the matching base.

Figure 9:
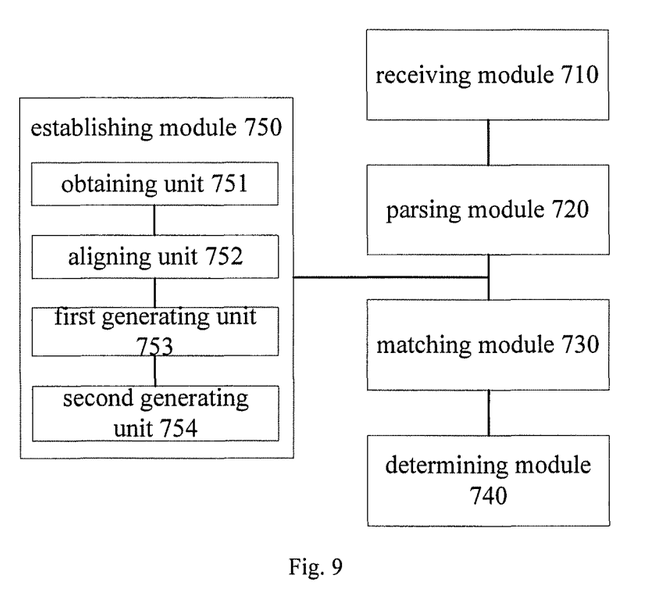
FIG. 9 is a schematic diagram of a device for locating an answer based on question and answer according to yet another embodiment of the present disclosure.

Specifically, as shown in FIG. 9, the establishing module 750 includes an obtaining unit 751, an aligning unit 752, a first generating unit 753, and a second generating unit 754.

The obtaining unit 751 is configured to obtain resources of question and answer pairs.

The resources of question and answer pairs include query sentence samples and corresponding answer samples.

The aligning unit 752 is configured to perform a statistical alignment on the resources of question and answer pairs, to obtain aligned resources of question and answer pairs.

The first generating unit 753 is configured to generate a phrase table according to the aligned resources of question and answer pairs.

The second generating unit 754 is configured to generate a probability for being a pair of each of the question and answer pairs according to the phrase table.

It should be noted that, the explanation in above embodiments of the method for locating an answer based on question and answer is also applicable to the embodiments of the device for locating an answer based on question and answer in this embodiment, with similar implementation principle, which is not described here.

With the device for locating an answer based on question and answer according to embodiments of the present disclosure, by obtaining the resources of question and answer pairs, performing the statistical alignment on the resources of question and answer pairs, obtaining the core word, generating the phrase table according to the aligned resources of question and answer pairs, and generating the probability for being a pair of each of the question and answer pairs to establish the matching base, a more accurate matching base can be obtained, thus ensuring accuracy of the final answer.

In order to realize the above embodiments, the present disclosure also provides a terminal including one or more processors and a storage configured to store executable instructions by the processors. The one or more processors are configured to execute following blocks.

In block S11', a query sentence is received.

In block S12', the query sentence is parsed, to generate a semantic parse tree corresponding to the query sentence.

In block S13', the semantic parse tree is matched with a pre-established matching base, to obtain an alignment probability between each of candidate answers in the pre-established matching base and the semantic parse tree.

In block S14', a final answer is determined according to the alignment probability.

It should be noted that, the explanation in above embodiments of the method for locating an answer based on question and answer is also applicable to the embodiments of the terminal in this embodiment, with similar implementation principle, which is not described here.

With the terminal according to embodiments of the present disclosure, by receiving the query sentence, parsing the query sentence to generate the semantic parse tree corresponding to the query sentence, matching the semantic parse tree with the pre-established matching base, to obtain the alignment probability between each of candidate answers in the pre-established matching base and the semantic parse tree, and determining the final answer according to the alignment probability, it is unnecessary for the user to click links and find an answer from redundant text contents, and answers that the user needs can be provided intuitively and clearly, thus deeply satisfying the search service demand of the user.

In order to realize the above embodiments, the present disclosure also provides a non-transitory computer-readable storage medium, configured to store one or more programs. When the one or more programs are executed by a processor of a mobile terminal, the mobile terminal is caused to execute a method for locating an answer based on question and answer according to the embodiments of the first aspect of the present disclosure.

With the non-transitory computer-readable storage medium according to embodiments of the present disclosure, by receiving the query sentence, parsing the query sentence to generate the semantic parse tree corresponding to the query sentence, matching the semantic parse tree with the pre-established matching base, to obtain the alignment probability between each of candidate answers in the pre-established matching base and the semantic parse tree, and determining the final answer according to the alignment probability, it is unnecessary for the user to click links and find an answer from redundant text contents, and answers that the user needs can be provided intuitively and clearly, thus deeply satisfying the search service demand of the user.

In order to realize the above embodiments, the present disclosure also provides a program product. When instructions in the program product are executed by a processor, the processor is configured to execute a method for locating an answer based on question and answer according to the embodiments of the first aspect of the present disclosure.

With the program product according to embodiments of the present disclosure, by receiving the query sentence, parsing the query sentence to generate the semantic parse tree corresponding to the query sentence, matching the semantic parse tree with the pre-established matching base, to obtain the alignment probability between each of candidate answers in the pre-established matching base and the semantic parse tree, and determining the final answer according to the alignment probability, it is unnecessary for the user to click links and find an answer from redundant text contents, and answers that the user needs can be provided intuitively and clearly, thus deeply satisfying the search service demand of the user.

It should be noted that, in the description of the present disclosure, terms such as "first" and "second" in descriptions of the present disclosure are used herein for purposes of description and are not intended to indicate or imply relative importance or significance. In addition, in the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for locating an answer based on question and answer, comprising:
   receiving, by a processor of a search engine, a query sentence input by a user via a search box;
   parsing the query sentence by the processor, to generate a semantic parse tree corresponding to the query sentence;
   matching the semantic parse tree with a pre-established matching base by the processor, to obtain an alignment probability between each of candidate answers in the pre-established matching base and the semantic parse tree;
   determining a final answer to the query sentence by the processor according to the alignment probability; and
   displaying the final answer on a result page of the search engine;
   wherein the alignment probability between each of candidate answers in the pre-established matching base and the semantic parse tree comprises a word alignment probability, matching the semantic parse tree with a pre-established matching base by the processor to obtain an alignment probability between each of candidate answers in the pre-established matching base and the semantic parse tree comprises: obtaining by the processor an alignment probability of each part of speech in the semantic parse tree based on a positive probability and a reverse probability of the part of speech and a preset weight for the part of speech; and obtaining by the processor the word alignment probability according to the alignment probability of each part of speech in the semantic parse tree;
   wherein the alignment probability between each of candidate answers in the pre-established matching base and the semantic parse tree comprises a phrase alignment probability; and
   wherein matching the semantic parse tree with a pre-established matching base by the processor to obtain an alignment probability between each of candidate answers in the pre-established matching base and the semantic parse tree comprises:
      calculating by the processor a product of an alignment probability of each of successfully matching phrases and a number of words in the respective successfully matching phrase, to obtain a positive probability and a reverse probability of each of the successfully matching phrases, wherein the successfully matching phrases are phrases that are successfully matched between candidate answers in the pre-established matching base and the semantic parsing tree; and
      obtaining by the processor a maximum value from the positive probability and the reverse probability of each of the successfully matching phrases, and performing a weighted summation on obtained maximum values to obtain the phrase alignment probability.

2. The method according to claim 1, further comprising: establishing by the processor the matching base.

3. The method according to claim 2, wherein establishing the matching base comprises:
   obtaining by the processor resources of question and answer pairs, wherein the resources of question and answer pairs comprise query sentence samples and corresponding answer samples;
   performing by the processor a statistical alignment on the resources of question and answer pairs, to obtain aligned resources of question and answer pairs;
   generating by the processor a phrase table according to the aligned resources of question and answer pairs; and
   generating by the processor a probability for being a pair of each of the question and answer pairs according to the phrase table.

4. The method according to claim 1, wherein determining a final answer to the query sentence by the processor according to the alignment probability comprises:
   ranking by the processor the candidate answers according to the word alignment probability, and determining a candidate answer having a highest ranking score as the final answer.

5. The method according to claim 1, wherein determining a final answer to the query sentence by the processor according to the alignment probability comprises:
   ranking by the processor the candidate answers according to the phrase alignment probability, and determining a candidate answer having a highest ranking score as the final answer.

6. A device for locating an answer based on question and answer, comprising:
   one or more processors of a search engine;
   a memory storing instructions executable by the one or more processors;
   wherein the one or more processors are configured to:
   receive a query sentence;
   parse the query sentence, to generate a semantic parse tree corresponding to the query sentence;
   match the semantic parse tree with a pre-established matching base, to obtain an alignment probability between each of candidate answers in the pre-established matching base and the semantic parse tree;
   determine a final answer according to the alignment probability; and
   display the final answer on a result page of the search engine;
   wherein the alignment probability between each of candidate answers in the pre-established matching base and the semantic parse tree comprises a word alignment probability, matching the semantic parse tree with a pre-established matching base by the processor to obtain an alignment probability between each of candidate answers in the pre-established matching base and the semantic parse tree comprises: obtaining by the processor an alignment probability of each part of speech in the semantic parse tree based on a positive probability and a reverse probability of the part of speech and a preset weight for the part of speech; and obtaining by the processor the word alignment probability according to the alignment probability of each part of speech in the semantic parse tree;

wherein the alignment probability between each of candidate answers in the pre-established matching base and the semantic parse tree comprises a phrase alignment probability; and wherein the one or more processors are configured to match the semantic parse tree with a pre-established matching base, to obtain an alignment probability between each of candidate answers in the pre-established matching base and the semantic parse tree by the acts of:

calculating a product of an alignment probability of each of successfully matching phrases and a number of words in the respective successfully matching phrase, to obtain a positive probability and a reverse probability of each of the successfully matching phrases, wherein the successfully matching phrases are phrases that are successfully matched between candidate answers in the pre-established matching base and the semantic parsing tree; and obtaining a maximum value from the positive probability and the reverse probability of each of the successfully matching phrases, and performing a weighted summation on obtained maximum values to obtain the phrase alignment probability.

7. The device according to claim 6, wherein the one or more processors are further configured to:

establish the matching base.

8. The device according to claim 7, wherein the one or more processors are configured to establish the matching base by acts of:

obtaining resources of question and answer pairs, wherein the resources of question and answer pairs comprise query sentence samples and corresponding answer samples;

performing a statistical alignment on the resources of question and answer pairs, to obtain aligned resources of question and answer pairs;

generating a phrase table according to the aligned resources of question and answer pairs; and generating a probability for being a pair of each of the question and answer pairs according to the phrase table.

9. The device according to claim 6, wherein the one or more processors are configured to determine a final answer according to the alignment probability by acts of:

ranking the candidate answers according to the word alignment probability, and determining a candidate answer having a highest ranking score as the final answer.

10. The device according to claim 6, wherein the one or more processors are configured to determine a final answer according to the alignment probability by acts of:

ranking the candidate answers according to the phrase alignment probability, and determining a candidate answer having a highest ranking score as the final answer.

11. A non-transitory computer-readable storage medium having stored therein instructions that, when executed by a processor of a search engine, cause the processor to perform a method for locating an answer based on question and answer, the method comprising:

receiving a query sentence;

parsing the query sentence, to generate a semantic parse tree corresponding to the query sentence;

matching the semantic parse tree with a pre-established matching base, to obtain an alignment probability between each of candidate answers in the pre-established matching base and the semantic parse tree;

determining a final answer according to the alignment probability; and displaying the final answer on a result page of the search engine;

wherein the alignment probability between each of candidate answers in the pre-established matching base and the semantic parse tree comprises a word alignment probability, matching the semantic parse tree with a pre-established matching base by the processor to obtain an alignment probability between each of candidate answers in the pre-established matching base and the semantic parse tree comprises: obtaining by the processor an alignment probability of each part of speech in the semantic parse tree based on a positive probability and a reverse probability of the part of speech and a preset weight for the part of speech; and obtaining by the processor the word alignment probability according to the alignment probability of each part of speech in the semantic parse tree;

wherein the alignment probability between each of candidate answers in the pre-established matching base and the semantic parse tree comprises a phrase alignment probability; and wherein matching the semantic parse tree with a pre-established matching base by the processor to obtain an alignment probability between each of candidate answers in the pre-established matching base and the semantic parse tree comprises:

calculating by the processor a product of an alignment probability of each of successfully matching phrases and a number of words in the respective successfully matching phrase, to obtain a positive probability and a reverse probability of each of the successfully matching phrases, wherein the successfully matching phrases are phrases that are successfully matched between candidate answers in the pre-established matching base and the semantic parsing tree; and obtaining by the processor a maximum value from the positive probability and the reverse probability of each of the successfully matching phrases, and performing a weighted summation on obtained maximum values to obtain the phrase alignment probability.

* * * * *